United States Patent
Becker et al.

(10) Patent No.: US 8,622,644 B2
(45) Date of Patent: Jan. 7, 2014

(54) SEAL ASSEMBLY AND METHOD FOR FORMING A SEAL ASSEMBLY

(75) Inventors: Dan J. Becker, Peoria, IL (US); Ross Paul Wietharn, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 97 days.

(21) Appl. No.: 13/091,336

(22) Filed: Apr. 21, 2011

(65) Prior Publication Data

US 2011/0293360 A1    Dec. 1, 2011

Related U.S. Application Data

(60) Provisional application No. 61/349,369, filed on May 28, 2010.

(51) Int. Cl.
*F16C 11/06*    (2006.01)

(52) U.S. Cl.
USPC ............................................ 403/50; 403/134

(58) Field of Classification Search
USPC ................... 403/50, 51, 134, 150, 120, 137; 277/634, 636
See application file for complete search history.

(56) References Cited

U.S. PATENT DOCUMENTS

| | | | | |
|---|---|---|---|---|
| 3,680,924 A * | 8/1972 | Otto et al. | ....................... | 305/102 |
| 3,707,852 A * | 1/1973 | Burckhardt et al. | .......... | 277/634 |
| 4,034,996 A * | 7/1977 | Manita et al. | ................. | 403/228 |
| 4,109,976 A * | 8/1978 | Koch | ............................ | 277/635 |
| 4,232,754 A | 11/1980 | Corrigan et al. | | |
| 4,385,673 A | 5/1983 | Olt Jr. | | |
| 4,553,760 A | 11/1985 | Reed et al. | | |
| 4,880,329 A * | 11/1989 | Sakai | ............................ | 403/134 |
| 5,284,398 A * | 2/1994 | Sakai | ............................ | 403/135 |
| 5,931,597 A * | 8/1999 | Urbach | ........................ | 403/134 |

FOREIGN PATENT DOCUMENTS

| | | |
|---|---|---|
| DE | 20 2004 017 767 U1 | 3/2005 |
| JP | 10-148233 A | 6/1998 |
| JP | 2003269525 A | 9/2003 |
| WO | WO 2004/081426 A1 | 9/2004 |

* cited by examiner

*Primary Examiner* — Michael P Ferguson
(74) *Attorney, Agent, or Firm* — Miller, Matthias & Hull (57) ABSTRACT

A seal assembly and method of forming a seal assembly provides a seal body having reduced strain during use, thereby increasing service life. The seal body may be formed within certain parameters, such as ranges of height-to-thickness and offset-to-height ratios, which have been found to reduce strain. Additionally or alternatively, the seal body may be modified from an initial configuration to a pre-strained configuration by axially displacing an inner section of the seal with respect to an outer section of the seal, which also reduces strain.

20 Claims, 4 Drawing Sheets

SEAL ASSEMBLY AND METHOD FOR FORMING A SEAL ASSEMBLY

CROSS-REFERENCE TO RELATED APPLICATION

This application claims the benefit of U.S. Provisional Application No. 61/349,369, filed May 28, 2010.

TECHNICAL FIELD

This disclosure relates generally to seal assemblies used on flexible joints and methods for forming such seal assemblies.

BACKGROUND

Flexible joints are used in a variety of apparatus, such as machines, to connect components that may move relative to one another. One type of flexible joint is a spherical joint, wherein two components are connected for compound movements by a semi-spherical bearing having a journal mounted therein. A pair of annular seal assemblies may be disposed on either side of the journal to protect the joint from debris or damage from the environment.

Sealing may be particularly advantageous when the joint is used in certain applications, such as on off-highway machines where the environment may include high levels of dust and debris. A mining truck, for example, may use a four bar link suspension to connect a rear axle to a frame. Spherical joints may be used at the opposite ends of each link to connect to either the frame or an axle housing, and each spherical joint, in turn, may use two seal assemblies to seal the journal. Accordingly, a four bar link suspension may include sixteen seal assemblies, with each seal assembly intended to withstand the potentially large deformations experienced during operation of the typically large-scale mining truck while protecting the journal from the environment.

During operation, the links may pivot to permit the axle housing to move relative to the frame. Pivoting of the links may cause relative rotational movement about a journal pin of each joint and pivotal movement transverse to the rotational movement. The seal assemblies deform during the transverse, pivotal movement which may curtail the service life of the seal assemblies. Conventional seal assemblies typically include a pair of inner and outer retaining rings with an elastomeric seal extending radially therebetween. Such a seal configuration has not shown a satisfactory service life when exposed to the pivotal movements experienced during operation of the machine.

Some conventional seal assemblies attempt to reduce the amount of strain experienced during operation by radially swaging the seal. Radial swaging typically involves compressing the outer surface of the seal inwardly to pre-strain the seal. While radial swaging may effectively reduce some seal strain during operation, such strain reduction may be insufficient for certain applications where the seals may experience significant deformation, requires at least one extra step during manufacturing, and is overly costly.

SUMMARY OF THE DISCLOSURE

According to certain aspects of this disclosure, a seal assembly for sealing between a first component and a second component is provided having an inner surface coupled to the first component and defining a seal assembly axis, the inner surface defining an inner contact face, and an outer surface coupled to the second component, the outer surface defining an outer contact face. A seal body extends between the inner surface and the outer surface, the seal body including a body inner section extending outwardly from the inner surface, a body outer section extending inwardly from the outer surface, and a body center section extending between the body inner section and the body outer section, the seal body defining a generally S-shaped cross-section.

In another aspect of the disclosure that may be combined with any of these aspects, the seal body has an initial configuration in which the inner contact face is spaced from the outer contact face by an initial offset distance I, wherein the initial offset distance I is approximately 3 to 22 mm.

In another aspect of the disclosure that may be combined with any of these aspects, the seal body defines a height H equal to a radial distance between the inner surface and the outer surface, and a thickness T equal to an average thickness of the body center section, wherein the seal body has a height-to-thickness ratio H/T of approximately 3 to 9.

In another aspect of the disclosure that may be combined with any of these aspects, the height-to-thickness ratio H/T is approximately 5 to 8.

In another aspect of the disclosure that may be combined with any of these aspects, the thickness T of the seal body is approximately 6 to 19 mm.

In another aspect of the disclosure that may be combined with any of these aspects, the offset distance I is approximately 5 to 16 mm.

In another aspect of the disclosure that may be combined with any of these aspects, a seal assembly for sealing between a first component and a second component includes an inner surface coupled to the first component and defining a seal assembly axis, an outer surface coupled to the second component, and a seal body extending between the inner surface and the outer surface, the seal body including a body inner section extending outwardly from the inner surface, a body outer section extending inwardly from the outer surface, and a body center section extending between the body inner section and the body outer section, the seal body defining a generally S-shaped cross-section. The seal body defines a height H equal to a radial distance between the inner surface and the outer surface, the body inner section includes a reference point A, and the seal body has an initial configuration and an installed configuration, wherein the body inner section is offset axially with respect to the body outer section so that the reference point A is displaced by an offset distance O between the initial configuration and the installed configuration.

In another aspect of the disclosure that may be combined with any of these aspects, the seal body further has an offset-to-height ratio O/H, wherein the offset-to-height ratio is 0.05 to 0.4.

In another aspect of the disclosure that may be combined with any of these aspects, the offset-to-height ratio O/H is approximately 0.1 to 0.3.

In another aspect of the disclosure that may be combined with any of these aspects, the offset-to-height ratio O/H is approximately 0.2.

In another aspect of the disclosure that may be combined with any of these aspects, a connection joint is provided having a pin coupled to a first component, the pin defining a central axis, a bushing coupled to the pin and defining a center of rotation, and a second component. A seal assembly seals between the first component and the second component and includes an inner surface coupled to the first component, an outer surface coupled to the second component, and a seal body extending between the inner surface and the outer surface, the seal body including a body inner section extending outwardly from the inner surface, a body outer section extending inwardly from the outer surface, and a body center section extending between the body inner section and the body outer section, the seal body defining a generally S-shaped cross-section. The seal body defines a height H equal to a radial distance between the inner surface and the outer surface. The body center section defines a centroid C substantially located at a geometric center point of the body center section, the centroid C being disposed along a angular reference line L that intersects the central axis of the pin, the angular reference line L being disposed at an angle α with respect to the central axis of the pin. The centroid C is further located at a radial distance Y from the central axis of the pin.

In another aspect of the disclosure that may be combined with any of these aspects, the angle α is approximately 51 to 61 degrees.

In another aspect of the disclosure that may be combined with any of these aspects, a height-to-radial distance ratio H/Y is approximately 0.4.

In another aspect of the disclosure that may be combined with any of these aspects, the angle α is approximately 56 degrees.

In another aspect of the disclosure that may be combined with any of these aspects, the seal body defines a thickness T equal to an average thickness of the body center section, and in which the thickness T is approximately 6 to 19 mm.

In another aspect of the disclosure that may be combined with any of these aspects, the seal body defines a thickness T equal to an average thickness of the body center section, and in which the seal body has a height-to-thickness ratio H/T of approximately 3 to 9.

In another aspect of the disclosure that may be combined with any of these aspects, a method of forming a seal assembly for sealing between a first component and a second component is provided including molding a seal from a resilient material to have an initial configuration, the seal having an inner surface coupled to the first component and defining a seal assembly axis, an outer surface coupled to the second component, a body inner section extending outwardly from the inner surface, a body outer section extending inwardly from the outer surface, and a body center section extending between the body inner section and the body outer section. The body outer section, body center section, and body inner section have a generally S-shaped configuration, with the inner surface disposed at a first axial position along the seal assembly axis relative to the outer surface in the initial configuration. The method further includes placing the seal in a pre-strained configuration by displacing the inner surface axially along the seal assembly axis to a second axial position relative to the outer surface, wherein the second axial position is offset from the first axial position by an offset distance O.

In another aspect of the disclosure that may be combined with any of these aspects, the offset distance O is approximately 3 to 22 mm.

In another aspect of the disclosure that may be combined with any of these aspects, the offset distance O is in a positive axial direction.

In another aspect of the disclosure that may be combined with any of these aspects, the offset distance O is in a negative axial direction.

In another aspect of the disclosure that may be combined with any of these aspects, the offset distance O is approximately 11 mm.

In another aspect of the disclosure that may be combined with any of these aspects, the seal body defines a thickness T equal to an average thickness of the body center section, and in which the thickness T is approximately 6 to 19 mm.

DETAILED DESCRIPTION

Figure 1:
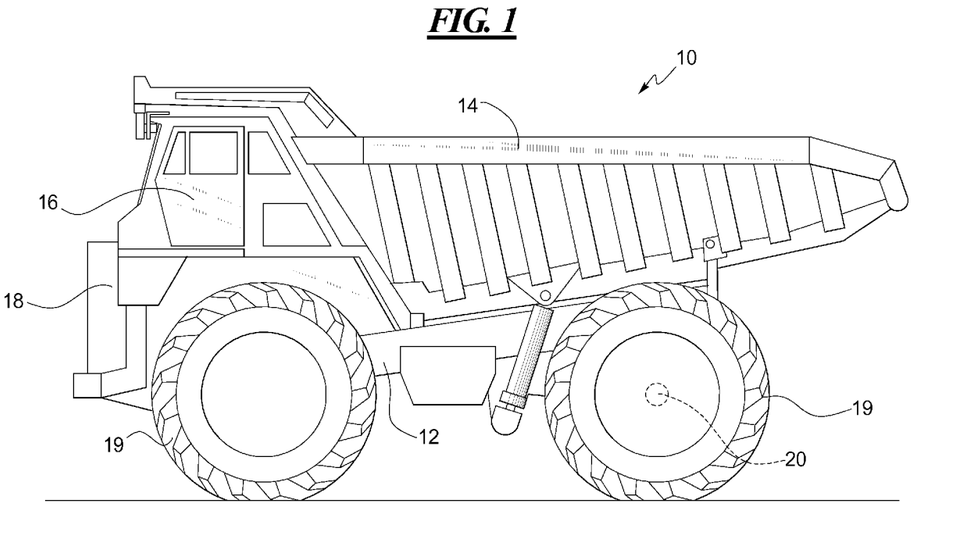
FIG. 1 is a side elevation view of a mining truck incorporating seal assemblies disclosed herein.

FIG. 1 illustrates a machine such as an off-highway truck 10. The machine 10 may have any suitable construction, and may include a frame 12 and an implement such as a material carrying dump body 14 pivotally mounted to the frame 12. An optional operator cab 16 may be mounted on the front of the frame 12 above a power system enclosure such as an engine enclosure 18. One or more power sources such as turbines, engines, batteries, fuel cells, or capacitors (not shown) may be housed within the engine enclosure 18 to provide power to a plurality of wheels 19, which support the truck on the ground. A rear axle 20 may be coupled to and rotatable with the wheels 19, and may be driven by the power source.

Figure 2:
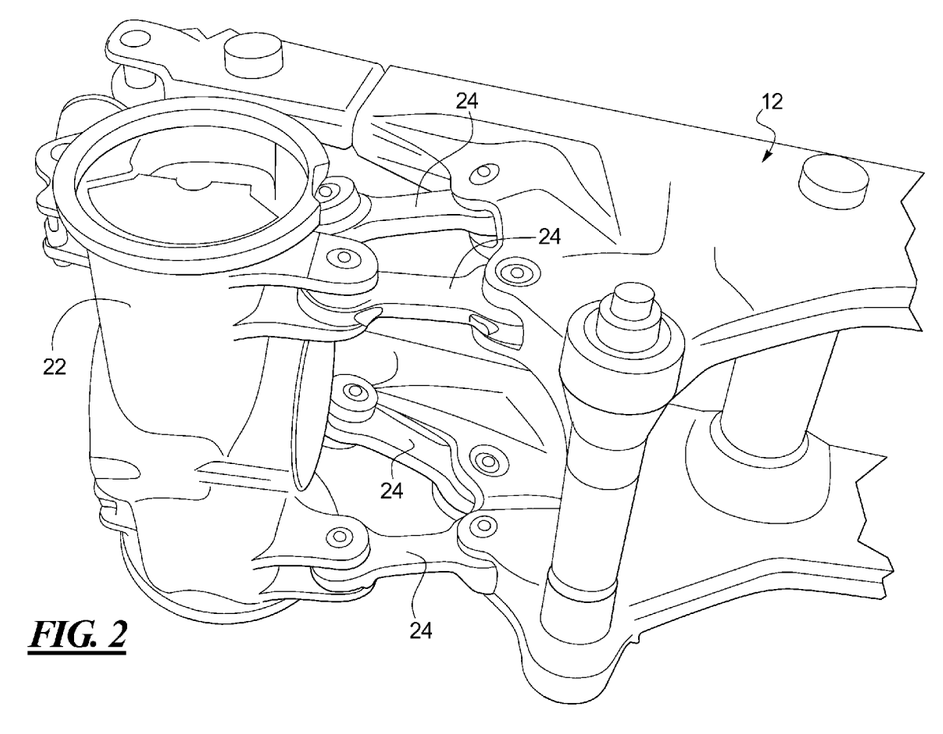
FIG. 2 is a perspective view of a four bar link suspension coupled to a frame of the truck of FIG. 1.

The rear axle 20 may be carried by an axle housing 22 suspended from the frame 12. Optionally and as best shown in FIG. 2, the axle housing 22 may be coupled to the frame by a four bar link suspension including four links 24. Each link 24 includes a first end pivotally coupled to the frame 12 and a second end pivotally coupled to the axle housing 22. The four bar link suspension permits the rear axle 20 to move vertically and rotationally (as well as a limited amount of lateral movement) with respect to the frame 12 while reducing the amount of bending and twisting stresses that may be transmitted to the frame 12 during operation of the machine.

Figure 3:
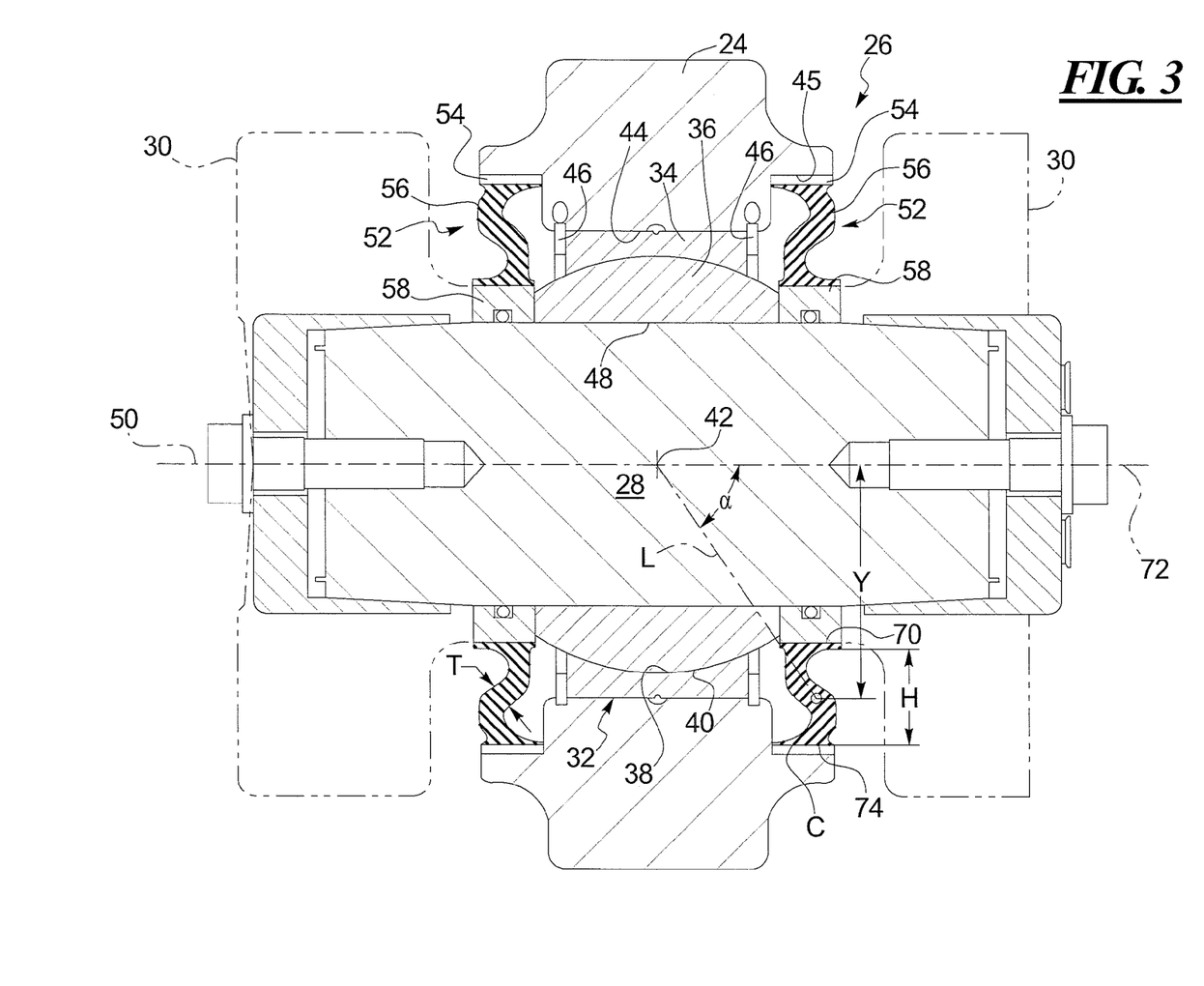
FIG. 3 is a side elevation view, in cross-section, of an end of a link used in the four bar link suspension of FIG. 2 showing spherical joint and seal assembly.

For example in one coupling method, a mechanical link, such as a spherical joint, may be coupled to each end of each link 24. The spherical joint provided on one end of the link 24 may join the link 24 to the frame 12, while the spherical joint provided on an opposite end of the link 24 may join the link 24 to the axle housing. As best shown in FIG. 3, the spherical joint 26 may include a pin 28 which extends between and is carried by a pair of lateral brackets 30 (illustrated in phantom lines in FIG. 3, for clarity) formed in either the frame 12 or the axle housing 22. The joint 26 further includes a spherical bearing assembly 32 having an outer raceway 34 and an inner ball 36. The raceway 34 and ball 36 have mating spherical bearing surfaces 38, 40, respectively, having a common center of revolution at 42. The raceway 34 may be of a split or two-piece construction to facilitate mounting of the ball 36. The raceway 34 is mounted in a bore 44 formed in the link 24. The raceway 34 may be retained within the bore 44 using any conventional means, such as a pair of snap rings 46 mounted on each side thereof.

The ball 36 has an inner cylindrical bearing surface 48 which receives the pin and rotatably and reciprocatably mounts the link 24 for rotational movement about and very limited axial movement along a central axis 50 of the pin 28. The rotational movement may also occur between the mating spherical surfaces 38, 40, however the spherical surfaces normally provide pivotal movement of the link 24 relative to the brackets 30 about the center 42 of the surfaces.

A pair of annular seal assemblies 52 is provided for sealing lubricant within the joint 26. Each seal assembly 52 is mounted between the link 24 and the pin 28 on a respective one of the opposite sides of the spherical bearing assembly 32 to continuously seal the joint 26 during operation thereof. As best shown in FIG. 3, each seal assembly 52 includes an outer mounting ring 54, a body 56, and an inner mounting ring 58. The entire body 56 may have a unitary construction of a tough, wear resistant, resilient material. For example, the body 56 may be formed of a suitable elastomer, such as, for example, chloroprene, urethane, nitrile, or natural rubber. The outer and inner mounting rings 54, 58 may be constructed from steel.

Figure 4A:
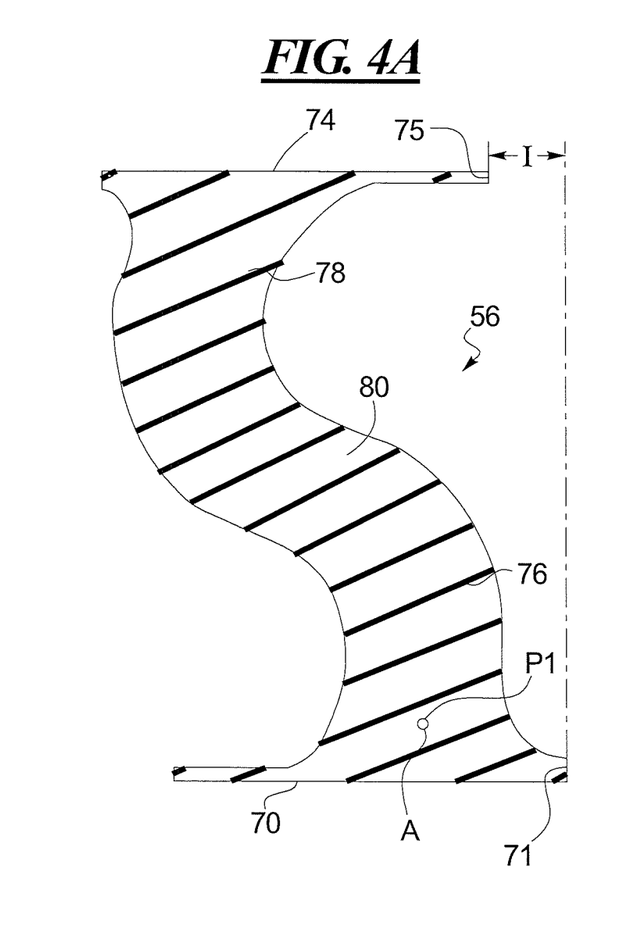
FIG. 4A is an enlarged side elevation view of a portion of a seal assembly in an initial configuration.
Figure 4B:
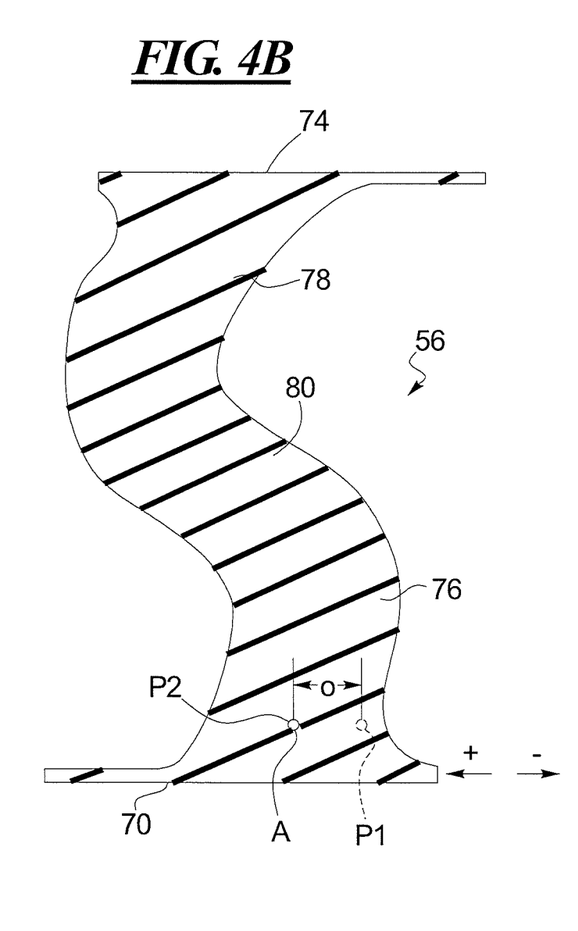
FIG. 4B is an enlarged side elevation view of the seal assembly of FIG. 4A placed in a pre-strained configuration.

The inventors have found seal assembly configurations and a process for forming the seal assembly that significantly reduce strain in the seal body 56 during use, thereby increasing service life. FIGS. 4A and 4B provide enlarged cross-sectional views of an upper half of one seal body 56. The seal body 56 includes a generally cylindrical inner surface 70 extending around a seal assembly axis 72 and coupled to the inner mounting ring 58 (FIG. 3). The seal body 56 also includes a generally cylindrical outer surface 74 coupled to the outer mounting ring 54. The inner surface 70 includes an inner contact face 71 and the outer surface 74 includes an outer contact face 75. The inner and outer contact faces 71, 75 are configured to engage portions of the spherical joint 26 when installed. An annular body inner section 76 extends outwardly from the inner surface 70 and an annular body outer section 78 extends inwardly from the outer surface 74. A body center section 80 extends between the body inner section 76 and the body outer section 78. The seal body 56 generally has an "S" shaped configuration.

The S-shaped seal body 56 may have an initial configuration which allows it to reduce strain during operation while still sufficiently protecting and sealing the spherical joint 26 from debris. Based on testing and analysis, the inventors have found that the seal body 56 may be molded in an initial configuration in which the inner contact face 71 is spaced from the outer contact face 75 by an initial offset distance "I". Modeling and analysis indicates that the initial offset distance "I" may be approximately 3 to 22 mm. The initial offset distance "I" may be in either axial direction. That is, the initial offset distance "I" may be in a negative axial direction (to the right as shown in FIG. 4B) or a positive axial direction (to the left as shown in FIG. 4B). The seal body 56 illustrated in FIG. 4A has an initial offset distance "I" in the negative axial direction. In addition to the range of initial offset distances "I" noted above, the initial offset distance "I" may be approximately 5 to 16 mm. Still further, the initial offset distance "I" may be approximately 11 mm.

Additionally or alternatively, the seal body 56 in the initial configuration may have a seal thickness that is sized proportionate to a seal cross-sectional height to reduce strain while maintaining a sufficient seal. As best shown in FIG. 3, the seal height "H" is the radial distance between the inner surface 70 and the outer surface 74. Accordingly, the height "H" is the span across which the seal body 56 extends between components. FIG. 3 also illustrates a web thickness "T" of the seal body 56. The web thickness "T" is substantially equal to an average thickness of the body center section 80. The inventors have found that seal bodies having a height-to-thickness ratio H/T of approximately 3 to 9 provide sufficient flexibility to permit movement of the spherical joint 26 while protecting the joint from debris and reducing strain within the seal body 56. In some embodiments, the height-to-thickness ratio H/T is approximately 5 to 8.

Additionally or alternatively, the S-shaped seal body 56 may be pre-strained by modifying it from the initial configuration into an installed configuration that further relieves strain during operation. In FIG. 4A, the seal body 56 is shown in an initial configuration, which may be the shape in which the body 56 is initially formed or molded. In the initial configuration of the exemplary embodiment, the inner surface 70 is disposed at a first axial position along the seal assembly axis 72 with respect to the outer surface 74. The body 56 may then be placed in a pre-strained configuration shown in FIG. 4B. In the exemplary pre-strained configuration, the inner surface 70 is displaced axially to the left with respect to the outer surface 74, as may be most readily apparent by comparing the initial position P1 of reference point A (FIG. 4A) to the offset position P2 of reference point A (FIG. 4B). The axial distance between positions P1 and P2 defines an offset distance "O". As shown by the arrows in FIG. 4B, movement of the inner surface 70 to the left as shown is a positive displacement, while movement to the right is a negative displacement. A ratio of the offset distance O to the seal body height H may be selected to reduce strain in the seal body 56. More specifically, in certain embodiments the offset-to-height ratio O/H may be approximately 0.05 to 0.4. In other embodiments, the offset-to-height ratio O/H may be approximately 0.1 to 0.3. In further embodiments, the offset-to-height ratio O/H is approximately 0.2. The offset distance O may be in either the positive axial direction (to the left in FIG. 4B) or the negative axial direction (to the right in FIG. 4B).

The body 56 may be placed in the pre-strained configuration during assembly of the joint 26. More specifically, with the body 56 in the initial configuration and the outer and inner mounting rings 54, 58 attached, the inner mounting ring 58 may be moved laterally until it engages an inner surface stop, such as the side of the ball 36. The outer ring 54 may then be slid into engagement with an outer surface stop, such as a counterbore 45 (FIG. 3) formed in the link 24. The counterbore 45 may be sized for a press fit with the outer ring 54.

The inventors have identified yet another relationship which yields an S-shaped seal body 56 having reduced strain during operation. This relationship uses the relative position of the seal body 56 with respect to the ball center 42 and the height H of the seal body 56. To identify the position of the seal body 56 relative to the ball center 42, an angular reference line "L" is provided in FIG. 3 which extends from the ball center 42 to a centroid "C" substantially located at a geometric center point of the body center section 80. The angular reference line L and the central axis 50 running through the center 42 form an angle $\alpha$ generally indicating a position of the seal body 56 with respect to the center 42. Additionally, a radial distance "Y" of the seal body 56 is defined as the radial distance from the central axis 50 to the centroid C. According to certain embodiments, the inventors have found that the angle $\alpha$ should be approximately 51 to 61 degrees and a height-to-radial distance ratio H/Y should be approximately 0.4. In other embodiment, the angle $\alpha$ may be approximately 56 degrees while maintaining the height-to-radial distance ratio H/Y of approximately 0.4. Additionally, the thickness T of the seal body 56 may also be selected so that the height-to-thickness ratio H/T is approximately 5 to 8, as discussed above.

INDUSTRIAL APPLICABILITY

In general, the seal assemblies disclosed above may be used to protect movable joints. Movable joints may be used to connect components used on various types of apparatus and/or machines. For example, seal assemblies may be used to protect the spherical joints of an off-highway truck. The seal assemblies disclosed herein may provide extended service life during operation.

The following provides details of exemplary embodiments suitable for large truck applications. The exemplary seal bodies may have a height H of approximately 56 mm, a thickness T of approximately 6 to 19 mm, and an offset distance O of approximately 3 to 22 mm in either the positive or negative axial direction. Additionally, the seal bodies may be positioned with respect to a ball center to have an angle α of approximately 56 degrees and a radial distance Y of approximately 130 mm. Accordingly, the exemplary seal bodies fall within the height-to-thickness ratio H/T, the offset-to-height ratio O/H, and the height-to-radial distance ratio and angle α ranges specified above.

Finite element analysis (FEA) was conducted on several of the exemplary large truck seal bodies specified above. According to the analysis, large truck seal bodies having the above specifications demonstrated sufficient flexibility, sufficient protection from debris, and reduced strain during operation.

Additionally, various offset distances O were analyzed for a seal body having a height H of approximately 56 mm. The FEA indicated that axial displacement creates pre-strains in the body that better counteract the strains encountered during operation, thereby reducing the resulting stress levels in the body. The analysis indicated that axial displacement of approximately 3 to 22 mm in either axial direction provided advantageous pre-strain.

Seal bodies having multiple different thicknesses T were analyzed with varying offset distances O. More specifically, seal bodies having thicknesses T ranging from approximately 6 to 19 mm were analyzed under offset distances ranging from approximately 3 to 22 mm in either axial direction. It was surprisingly determined that, for each given thickness T, strain was minimized by roughly the same offset distance O. According to the analysis, an offset distance O of approximately 3 to 22 mm was advantageous. In other embodiments, an offset distance O of approximately 5 to 16 mm was advantageous. Still further, an offset distance O of approximately 11 mm provided advantageous strain reduction for each thickness T. Furthermore, strain was generally found to lower as the thickness T was reduced. In large truck applications, it was determined that a thickness T of approximately 10 to 15 mm provided sufficient strain reduction while maintaining sufficient thickness to protect against debris encountered in typical off-road conditions.

During the FEA, strains were estimated for two extreme seal body conditions. More specifically, models of the seal bodies were analyzed in positive and negative tilting conditions in which the outer surface is rotated approximately 6 degrees above horizontal and the outer surface is rotated approximately 6 degrees below horizontal, respectively. The resulting strains in the seal bodies were then determined and analyzed.

What is claimed is:

1. A spherical joint connecting a first component to a second component, comprising:
    a pin coupled to the first component, the pin defining a central axis;
    a spherical bearing assembly coupled to the pin and to the second component and defining a center of rotation, the spherical bearing assembly allowing relative movement between the first component and the second component;
    an inner mounting ring mounted on the pin and engaged by an inner surface stop of the spherical bearing assembly;
    an outer mounting ring operatively coupled to the second component and engaged by an outer surface stop of the second component;
    a seal body having an inner surface coupled to the inner mounting ring and defining an inner contact face and an outer surface coupled to the outer mounting ring and defining an outer contact face a body inner section extending outwardly from the inner surface, a body outer section extending inwardly from the outer surface, and a body center section extending between the body inner section and the body outer section, the seal body defining a generally S-shaped cross-section and a height H equal to a radial distance between the inner surface and the outer surface, and including a reference point A proximate the inner surface, and the seal body having an initial configuration in which the inner contact face is spaced from the outer contact face by an initial offset distance I when the inner surface and the outer surface are not coupled to the inner mounting ring and the outer mounting ring, respectively, wherein the initial offset distance I along a seal assembly axis is approximately 3 to 22 mm,
    wherein the spherical joint is installed with the seal body in a pre-strained configuration when the inner surface and the outer surface are coupled to the inner mounting ring and the outer mounting ring, respectively, the inner mounting ring is mounted on the pin, and the outer mounting ring is coupled to the second component, wherein the reference point A is displaced in an axial direction relative to the outer surface by an offset distance O such that the seal body has an offset-to-height ratio O/H within the range of 0.05 to 0.4 in the pre-strained configuration.

2. The spherical joint of claim 1, in which:
    the seal body defines a thickness T equal to an average thickness of the body center section; and
    the seal body has a height-to-thickness ratio H/T of approximately 3 to 9.

3. The spherical joint of claim 2, in which the height-to-thickness ratio H/T is approximately 5 to 8.

4. The spherical joint of claim 2, in which the thickness T is approximately 6 to 19 mm.

5. The spherical joint of claim 1, in which the initial offset distance I is approximately 5 to 16 mm.

6. A spherical joint connecting a first component to a second component, comprising:
    a pin coupled to the first component, the pin defining a central axis;
    a spherical bearing assembly coupled to the pin and to the second component and defining a center of rotation, the spherical bearing assembly allowing relative movement between the first component and the second component;
    an inner mounting ring mounted on the pin and engaged by an inner surface stop of the spherical bearing assembly;
    an outer mounting ring operatively coupled to the second component and engaged by an outer surface stop of the second component;
    a seal body having an inner surface defining a seal assembly and coupled to the inner mounting ring and an outer surface coupled to the outer mounting ring, the seal body including a body inner section extending outwardly from the inner surface, a body outer section extending inwardly from the outer surface, and a body center section extending between the body inner section and the body outer section, the seal body defining a generally S-shaped cross-section;

the seal body defining a height H equal to a radial distance between the inner surface and the outer surface;

the body inner section including a reference point A;

the seal body having an initial configuration with the reference point A disposed at an initial position and a pre-strained configuration, wherein the body inner section is offset axially with respect to the body outer section so that the reference point A is displaced by an offset distance O between the initial configuration when the inner surface and the outer surface are not coupled to the inner mounting ring and the outer mounting ring, respectively, and the pre-strained configuration when the inner surface and the outer surface are coupled to the inner mounting ring and the outer mounting ring, respectively, the inner mounting ring is mounted on the pin, and the outer mounting ring is coupled to the second component; and the seal body having an offset-to-height ratio O/H in the installed configuration wherein the offset-to-height ratio is 0.05 to 0.4.

7. The spherical joint of claim 6, in which the offset-to-height ratio O/H is approximately 0.1 to 0.3.

8. The spherical joint of claim 6, in which the offset-to-height ratio O/H is approximately 0.2.

9. The spherical joint of claim 6, in which the offset distance O is in a positive axial direction.

10. The spherical joint of claim 6, in which the offset distance O is in a negative axial direction.

11. A connection joint connecting a first component to a second component, comprising:

a pin coupled to the first component, the pin defining a central axis;

a spherical bearing assembly coupled to the pin and to the second component and defining a center of rotation, the spherical bearing assembly allowing relative movement between the first component and the second component;

a seal assembly for sealing between the first component and the second component, the seal assembly including:

an inner mounting ring mounted on the pin and engaged by an inner surface stop of the spherical bearing assembly;

an outer mounting ring operatively coupled to the second component and engaged by an outer surface stop of the second component;

a seal body having an inner surface coupled to the inner mounting ring, an outer surface coupled to the outer mounting ring a body inner section extending outwardly from the inner surface, a body outer section extending inwardly from the outer surface, and a body center section extending between the body inner section and the body outer section, the seal body defining a generally S-shaped cross-section and a height H equal to a radial distance between the inner surface and the outer surface, wherein the seal assembly is installed with the seal body in a pre-strained configuration when the inner surface and the outer surface are coupled to the inner mounting ring and the outer mounting ring, respectively, the inner mounting ring is mounted on the pin, and the outer mounting ring is coupled to the second component, wherein a reference point A proximate the inner surface is displaced in an axial direction relative to the outer surface by an offset distance O relative to an initial configuration of the seal body when the inner surface and the outer surface are not coupled to the inner mounting ring and the outer mounting ring, respectively;

the body center section defining a centroid C substantially located at a geometric center point of the body center section, the centroid C being disposed along a angular reference line L that intersects the central axis of the pin at the center of rotation of the spherical bearing assembly, the angular reference line L being disposed at an angle α with respect to the central axis of the pin; and the centroid C further being located at a radial distance Y from the central axis of the pin;

wherein the angle α is approximately 51 to 61 degrees and a height-to-radial distance ratio H/Y is approximately 0.4.

12. The connection joint of claim 11, in which the angle α is approximately 56 degrees.

13. The connection joint of claim 11, in which the seal body defines a thickness T equal to an average thickness of the body center section, and in which the thickness T is approximately 6 to 19 mm.

14. The connection joint of claim 11, in which the seal body defines a thickness T equal to an average thickness of the body center section, and in which the seal body has a height-to-thickness ratio H/T of approximately 3 to 9.

15. A method of forming a seal assembly for sealing lubricant within a spherical joint having a in and a spherical bearing assembly coupled to the pin connecting a first component and a second component and allowing relative movement between the first component and the second component, the method comprising:

molding a seal body from a resilient material to have an initial configuration, the seal body including:

an inner surface defining a seal assembly axis;

an outer surface;

a body inner section extending outwardly from the inner surface;

a body outer section extending inwardly from the outer surface; and a body center section extending between the body inner section and the body outer section;

wherein the body outer section, body center section, and body inner section have a generally S-shaped configuration, wherein the seal body defines a height H equal to a radial distance between the inner surface and the outer surface, and coupling the outer surface of the seal body to an outer mounting ring;

coupling the inner surface of the seal body to an inner mounting ring;

wherein a reference point A proximate the inner surface is disposed at a first axial position along the seal assembly axis relative to the outer surface in the initial configuration when the inner surface and the outer surface are not coupled to the inner mounting ring and the outer mounting ring, respectively;

mounting the inner mounting ring on the pin with the inner mounting ring being engaged by an inner surface stop of the spherical bearing assembly; and coupling the outer mounting ring to the second component with the inner mounting ring being engaged by an outer surface stop of the second component, and thereby placing the seal body in a pre-strained configuration by displacing the reference point A axially along the seal assembly axis to a second axial position relative to the outer surface when the inner surface and the outer surface are coupled to the inner mounting ring and the outer mounting ring, respectively, the inner mounting ring is mounted on the pin, and the outer mounting ring is coupled to the second component, wherein the second axial position is offset from the first axial position by an offset distance O, and wherein the seal body has an offset-to-height ratio O/H that is approximately 0.05 to 0.4 in the second axial position.

16. The method of claim 15, in which the offset distance O is approximately 3 to 22 mm.

17. The method of claim 15, in which the offset distance O is in a positive axial direction.

18. The method of claim 15, in which the offset distance O is in a negative axial direction.

19. The method of claim 15, in which the offset distance O is approximately 11 mm.

20. The method of claim 15, in which the seal body defines a thickness T equal to an average thickness of the body center section, and in which the thickness T is approximately 6 to 19 mm.

* * * * *